（12）United States Patent
Yang Mao et al.

(10) Patent No.: US 12,444,323 B1
(45) Date of Patent: Oct. 14, 2025

(54) MOTION FORCE FEEDBACK DEVICE AND MOTION FORCE FEEDBACK METHOD

(71) Applicant: Industrial Technology Research Institute, Hsinchu (TW)

(72) Inventors: Shih-Fang Yang Mao, Hsinchu County (TW); Cheng-Yen Tsai, Keelung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 18/955,990

(22) Filed: Nov. 22, 2024

(51) Int. Cl.
*G09B 23/32* (2006.01)
*G01C 21/16* (2006.01)

(52) U.S. Cl.
CPC ........... *G09B 23/32* (2013.01); *G01C 21/165* (2013.01)

(58) Field of Classification Search
CPC ....... G09B 23/32; G01C 21/16; G01C 21/165
See application file for complete search history.

(56) References Cited

U.S. PATENT DOCUMENTS

| | | | | |
|---|---|---|---|---|
| 6,057,828 | A * | 5/2000 | Rosenberg | G09B 23/28 345/161 |
| 9,280,918 | B2 * | 3/2016 | Martinez | G09B 25/025 |
| 11,635,279 | B2 | 4/2023 | Colachis et al. | |
| 2010/0266994 | A1 * | 10/2010 | Gregoire | G09B 9/12 434/55 |
| 2014/0180451 | A1 * | 6/2014 | Marty | G06V 40/23 700/91 |
| 2015/0121989 | A1 | 5/2015 | Orzechowski | |
| 2018/0373966 | A1 | 12/2018 | Beschorner et al. | |
| 2019/0033466 | A1 | 1/2019 | Palella et al. | |
| 2019/0094955 | A1 | 3/2019 | Zuber et al. | |
| 2021/0347338 | A1 | 11/2021 | Strege et al. | |

FOREIGN PATENT DOCUMENTS

CN 115963926 4/2023

OTHER PUBLICATIONS

"Notice of allowance of Taiwan Counterpart Application", issued on Jul. 28, 2025, p. 1-p. 3.

* cited by examiner

*Primary Examiner* — Timothy A Musselman
(74) *Attorney, Agent, or Firm* — JCIPRNET

(57) ABSTRACT

A motion force feedback device and a motion force feedback method are provided. The method includes following steps of: measuring a position and a direction of an object in a space by an inertial measurement unit; measuring a velocity change of the object relative to an ambient fluid and a relative moving velocity of the ambient fluid in at least one direction by an air velocity sensing unit; dynamically adjusting a magnitude and a direction of a centrifugal force to provide force feedback by a vector force feedback unit; and calculating a measurement signal obtained from the inertial measurement unit and the air velocity sensing unit by a processor to generate a moving distance and a moving direction of the object in the space, and activating the vector force feedback unit to provide the force feedback by the processor according to a moving posture of the object and a contact force with the object.

18 Claims, 3 Drawing Sheets

MOTION FORCE FEEDBACK DEVICE AND MOTION FORCE FEEDBACK METHOD

TECHNICAL FIELD

The disclosure relates to a motion force feedback device and a motion force feedback method.

RELATED ART

In the existing technology, the positioning accuracy of an object in space is often affected by external interference or environmental factors. Traditional positioning technology relies on a single accelerometer or angular velocity meter, which cannot provide sufficiently accurate data, resulting in inaccurate object positioning. In addition, many force feedback devices can only provide feedback in limited directions, so experiences of users are limited to forces in a single direction, and the users cannot truly experience complex multi-directional feedback, which greatly reduces application scopes and simulation effects of the force feedback devices. Furthermore, traditional force feedback devices are usually unable to dynamically adjust magnitudes and directions of feedback forces according to motion postures or contact forces of the users, which results in force feedback effects being too monotonous and lacking in variability.

SUMMARY

The disclosure provides a motion force feedback device and a motion force feedback method, which can provide a user with more realistic and more obvious force feedback.

A motion force feedback device of the disclosure includes an inertial measurement unit (IMU), an air velocity sensing (AVS) unit, a vector force feedback unit, and a processor. The inertial measurement unit is configured to measure a position and a direction of an object in a space. The inertial measurement unit includes at least one accelerometer and at least one gyroscope. The accelerometer is configured to measure linear acceleration, and the gyroscope is configured to measure angular velocity. The air velocity sensing unit is configured to measure a velocity change of the object relative to an ambient fluid and a relative moving velocity of the ambient fluid in at least one direction. The vector force feedback unit includes a motor and a rotation mechanism coupled to the motor. The vector force feedback unit is configured to dynamically adjust a magnitude and a direction of a centrifugal force to provide force feedback. The processor is coupled to the inertial measurement unit, the air velocity sensing unit, and the vector force feedback unit. The processor is configured to calculate a measurement signal obtained from the inertial measurement unit and the air velocity sensing unit to generate a moving distance and a moving direction of the object in the space, and the processor is configured to activate the vector force feedback unit to provide the force feedback according to a moving posture of the object and a contact force with the object.

A motion force feedback method of the disclosure is adapted to a device including an inertial measurement unit (IMU), an air velocity sensing (AVS) unit, a vector force feedback unit, and a processor. The inertial measurement unit includes at least one accelerometer and at least one gyroscope. The vector force feedback unit includes a motor and a rotation mechanism coupled to the motor. The motion force feedback method includes the following steps. A position and a direction of an object in a space are measured by the inertial measurement unit. The accelerometer is configured to measure linear acceleration, and the gyroscope is configured to measure angular velocity. A velocity change of the object relative to an ambient fluid and a relative moving velocity of the ambient fluid in at least one direction are measured by the air velocity sensing unit. A magnitude and a direction of a centrifugal force are dynamically adjusted by the vector force feedback unit to provide force feedback. A measurement signal obtained from the inertial measurement unit and the air velocity sensing unit is calculated by the processor to generate a moving distance and a moving direction of the object in the space, and the vector force feedback unit is activated to provide the force feedback by the processor according to a moving posture of the object and a contact force with the object.

Based on the above, the motion force feedback device and the motion force feedback method of the disclosure may obtain the measurement signal from the inertial measurement unit and the air velocity sensing unit to more accurately position the object in the space. Furthermore, the vector force feedback unit of the motion force feedback device and the motion force feedback method of the disclosure may dynamically adjust the magnitude and the direction of the centrifugal force to provide multi-directional force feedback. Based on this, the disclosure can provide the user with more realistic and more obvious force feedback.

DISCLOSURED EMBODIMENTS

Figure 1:
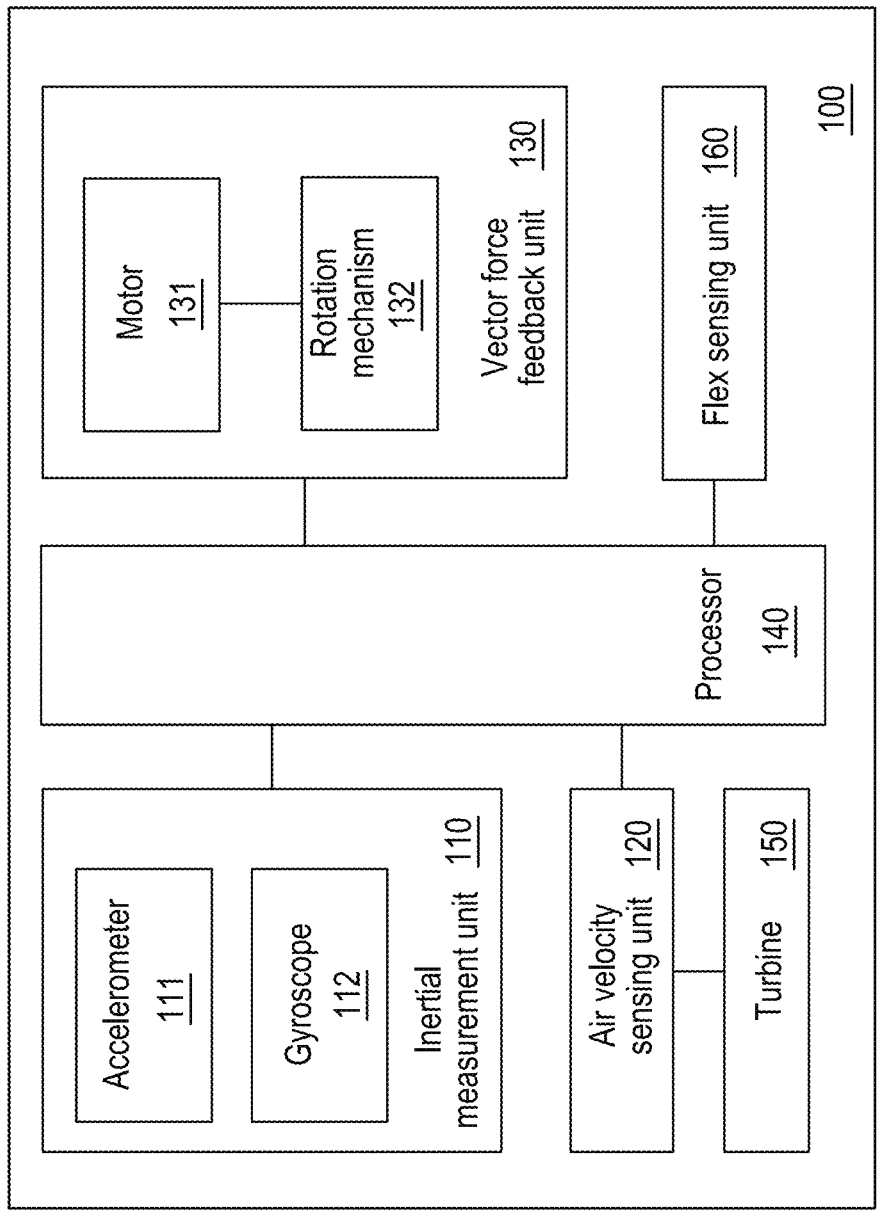
FIG. 1 is a schematic diagram of a motion force feedback device according to an embodiment of the disclosure.

FIG. 1 is a schematic diagram of a motion force feedback device 100 according to an embodiment of the disclosure. Please refer to FIG. 1. The motion force feedback device 100 may include an inertial measurement unit (IMU) 110, an air velocity sensing (AVS) unit 120, a vector force feedback unit 130, and a processor 140. The inertial measurement unit 110 may include at least one accelerometer 111 and at least one gyroscope 112. The vector force feedback unit 130 may include a motor 131 and a rotation mechanism 132 coupled to the motor 131. The processor 140 may be coupled to the inertial measurement unit 110, the air velocity sensing unit 120, and the vector force feedback unit 130. In an embodiment, the motion force feedback device 100 may be disposed on a smart glove. In another embodiment, the motion force feedback device 100 may be disposed on a puppet object used for medical interactive teaching. However, the disclosure is not limited thereto.

The processor 140 is, for example, a central processing unit (CPU), other programmable general-purpose or specific-purpose micro control units (MCU), microprocessors, digital signal processors (DSP), programmable controllers, application specific integrated circuits (ASIC), graphics processing units (GPU), image signal processors (ISP), image processing units (IPU), arithmetic logic units (ALU), complex programmable logic devices (CPLD), field programmable gate arrays (FPGA), other similar elements, or a combination of the above elements.

In an embodiment, the motion force feedback device 100 may include a turbine 150 coupled to the air velocity sensing unit 120.

In an embodiment, the motion force feedback device 100 may include a flex sensing unit 160 coupled to the processor 140.

Figure 2:
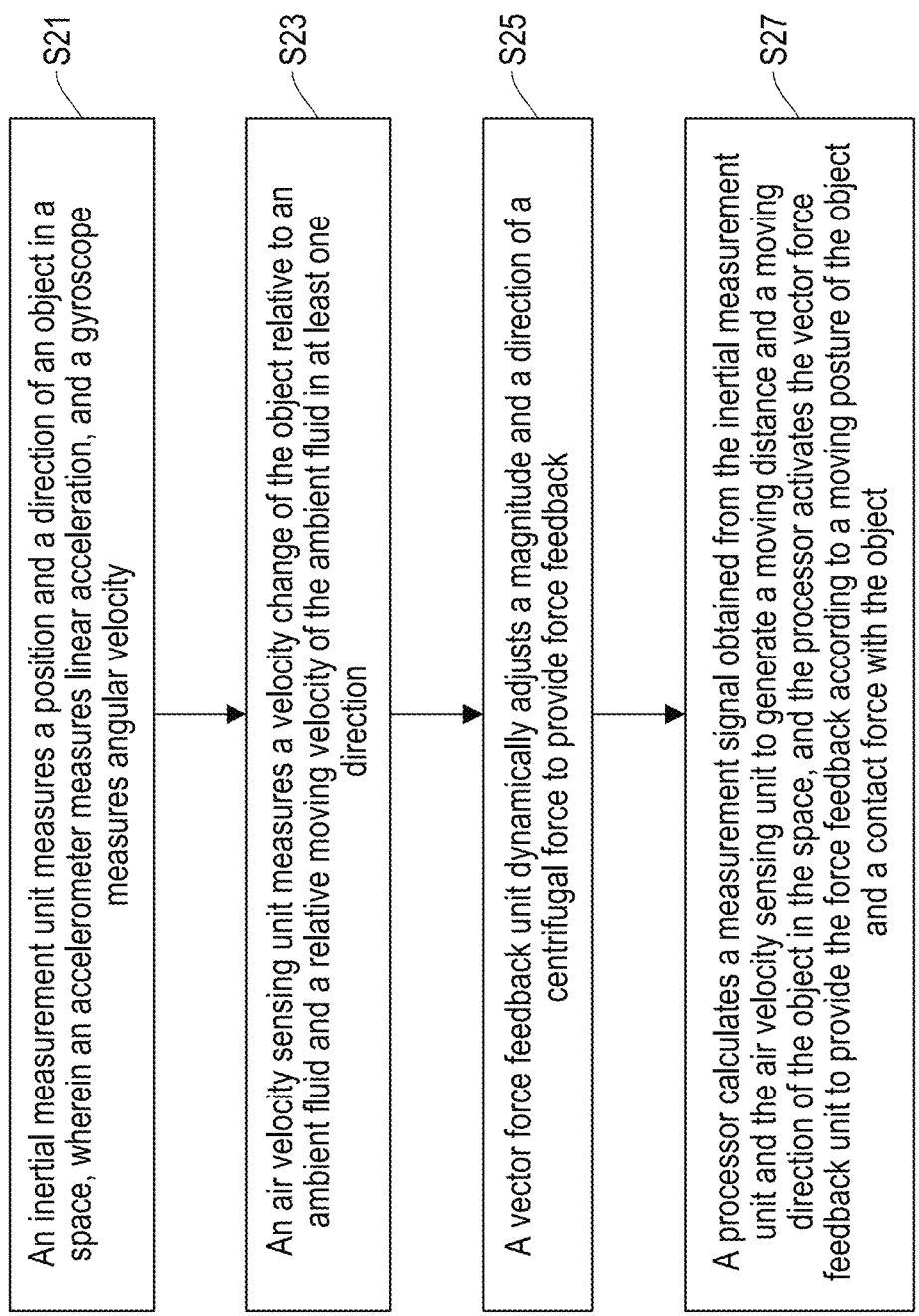
FIG. 2 is a flowchart of a motion force feedback method according to an embodiment of the disclosure.

FIG. 2 is a flowchart of a motion force feedback method according to an embodiment of the disclosure, wherein the motion force feedback method may be implemented by the motion force feedback device 100 shown in FIG. 1. Please refer to both FIG. 1 and FIG. 2.

In step S21, the inertial measurement unit 110 may be configured to measure a position and a direction of an object in a space, wherein the accelerometer 111 may be configured to measure linear acceleration, and the gyroscope 112 may be configured to measure angular velocity.

In step S23, the air velocity sensing unit 120 may be configured to measure a velocity change of the object relative to an ambient fluid and a relative moving velocity of the ambient fluid in at least one direction. For example, the ambient fluid is, for example, wind.

In step S25, the vector force feedback unit 130 may be configured to dynamically adjust a magnitude and a direction of a centrifugal force to provide force feedback.

In step S27, the processor 140 may be configured to calculate a measurement signal obtained from the inertial measurement unit 110 and the air velocity sensing unit 120 to generate a moving distance and a moving direction of the object in the space, and the processor 140 may be configured to activate the vector force feedback unit 130 to provide the force feedback according to a moving posture of the object and a contact force with the object.

For example, in the embodiment in which the motion force feedback device 100 is disposed on the smart glove, when a user wears the smart glove and uses the smart glove to grasp a virtual object, the motion force feedback device 100 may provide the force feedback to the user.

On the other hand, in the embodiment in which the motion force feedback device 100 is disposed on the puppet object for medical interactive teaching, when the user contacts/moves the puppet object, the motion force feedback device 100 may provide the force feedback to the user according to a limb position and a force of the user contacting/moving the puppet object. Alternatively, when the action of the user contacting/moving the puppet object is successfully completed (or there is an error in the action), the motion force feedback device 100 may provide the force feedback to the user.

Figure 3:
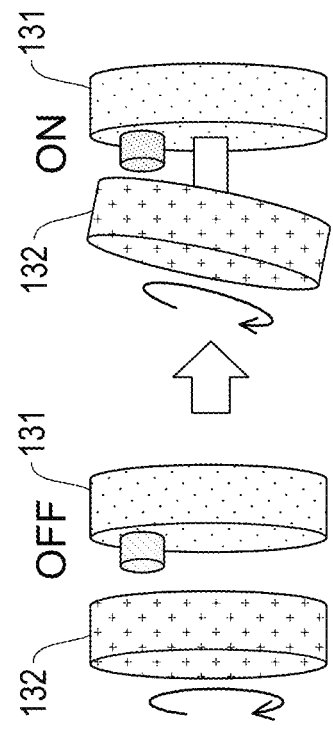
FIG. 3 is a further explanation of the motion force feedback device shown in FIG. 1.
Figure 3:
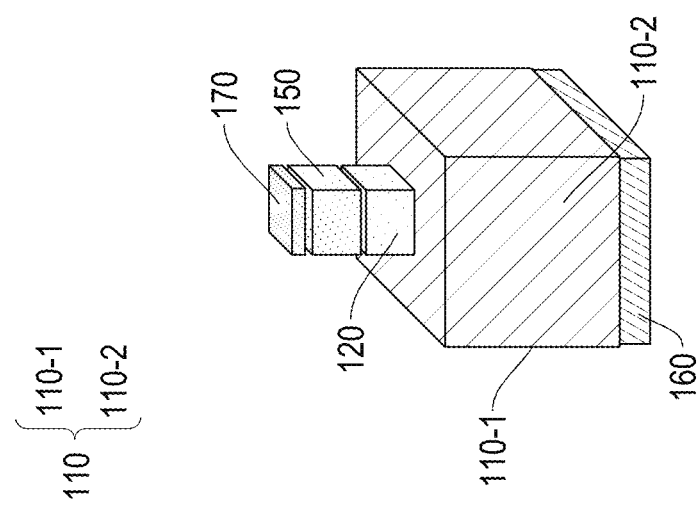

FIG. 3 is a further explanation of the motion force feedback device 100 shown in FIG. 1. Please refer to both FIG. 1 and FIG. 3.

In an embodiment, the inertial measurement unit 110 may include an inertial measurement unit 110-1 for measurement in the X direction and may include an inertial measurement unit 110-2 for measurement in the Y direction.

In an embodiment, the air velocity sensing unit 120 may be configured to measure an ambient fluid throughput of the ambient fluid flowing through the object. Specifically, the processor 140 may generate the moving distance of the object in the space according to the ambient fluid throughput. For example, the processor 140 may calculate the moving distance according to formula 1 below.

$$d_p = \frac{1}{n}\sum_{i=p}^{p-n} a \times Q_i \quad \text{(Formula 1)}$$

where p is a time point, $d_p$ is the moving distance of the object at the time point p, $Q_i$ is the ambient fluid throughput measured by the air velocity sensing unit 120 at a time point i, a is a conversion parameter between the ambient fluid throughput and the moving distance, and n is configured to refer back to several previous data to calculate an average.

In an embodiment, the number of the air velocity sensing unit 120 is 1. The turbine 150 may be configured to collect the ambient fluid from different directions to the air velocity sensing unit 120. In detail, the turbine 150 may be in a spiral shape or a seashell shape. For example, the turbine 150 may collect the wind from different directions to the air velocity sensing unit 120, and the turbine 150 may concentrate the wind using the spiral structure.

In another embodiment, the air velocity sensing unit 120 may include multiple sub-air velocity sensing units, wherein the sub-air velocity sensing units may be respectively configured to collect the ambient fluid from different directions.

In an embodiment, the motion force feedback device 100 may include a fan cover 170. The fan cover 170 may be disposed above the turbine 150.

In an embodiment, the processor 140 may generate the moving direction of the object in the space according to the linear acceleration and the angular velocity. In other words, the processor 140 may generate the moving direction of the object in the space according to the measurement signal obtained from the inertial measurement unit 110.

In an embodiment, the inertial measurement unit 110 may be disposed on a joint of the puppet object. The joint is, for example, a knee. Based on this, the motion force feedback device 100 of the disclosure may more accurately detect whether the puppet object is turned over or flexed to provide more accurate force feedback.

In an embodiment, the processor 140 may be configured to calculate the measurement signal obtained from the flex sensing unit 160 to generate the moving distance and the moving direction of the object in the space.

In an embodiment, the motor 131 may include a flat motor.

In an embodiment, the rotation mechanism 132 may include unilateral magnetic guidance, such as an unbalanced vibration generator. Specifically, the motion force feedback device 100 of the disclosure may generate rotational forces in opposite directions based on the moment when a rotational axis of a rotating object is changed, thereby generating multi-directional vector force feedback. When the motor 131 drives the unbalanced vibration generator, the motion force feedback device 100 generates unilateral vibration. Based on this, compared to vibration feedback that is generally only in a single direction, the motion force feedback device 100 of the disclosure may provide more realistic and more obvious force feedback.

In summary, the motion force feedback device and the motion force feedback method of the disclosure may obtain the measurement signal from the inertial measurement unit and the air velocity sensing unit to more accurately position the object in the space. Furthermore, the vector force feedback unit of the motion force feedback device and the motion force feedback method of the disclosure may dynamically adjust the magnitude and the direction of the centrifugal force to provide multi-directional force feedback. Based on this, the disclosure can provide the user with more realistic and more obvious force feedback.

What is claimed is:

1. A motion force feedback device, comprising:
   an inertial measurement unit (IMU), configured to measure a position and a direction of an object in a space, wherein the inertial measurement unit comprises at least one accelerometer and at least one gyroscope, the accelerometer is configured to measure linear acceleration, and the gyroscope is configured to measure angular velocity;

an air velocity sensing (AVS) unit, configured to measure a velocity change of the object relative to an ambient fluid and a relative moving velocity of the ambient fluid in at least one direction;

a vector force feedback unit, comprising a motor and a rotation mechanism coupled to the motor, wherein the vector force feedback unit is configured to dynamically adjust a magnitude and a direction of a centrifugal force to provide force feedback; and a processor, coupled to the inertial measurement unit, the air velocity sensing unit, and the vector force feedback unit, wherein the processor is configured to calculate a measurement signal obtained from the inertial measurement unit and the air velocity sensing unit to generate a moving distance and a moving direction of the object in the space, and activate the vector force feedback unit to provide the force feedback according to a moving posture of the object and a contact force with the object.

2. The motion force feedback device according to claim 1, wherein the air velocity sensing unit is further configured to measure an ambient fluid throughput of the ambient fluid flowing through the object, wherein the processor generates the moving distance of the object in the space according to the ambient fluid throughput.

3. The motion force feedback device according to claim 1, further comprising a turbine coupled to the air velocity sensing unit, wherein a number of the air velocity sensing unit is 1, wherein the turbine is configured to collect the ambient fluid in the direction from different directions to the air velocity sensing unit.

4. The motion force feedback device according to claim 1, wherein the air velocity sensing unit comprises a plurality of sub-air velocity sensing units, wherein the sub-air velocity sensing units are respectively configured to collect the ambient fluid in the direction from different directions.

5. The motion force feedback device according to claim 1, wherein the processor generates the moving direction of the object in the space according to the linear acceleration and the angular velocity.

6. The motion force feedback device according to claim 1, wherein the inertial measurement unit is disposed on a joint of a puppet object.

7. The motion force feedback device according to claim 1, further comprising a flex sensing unit coupled to the processor, wherein the processor is further configured to calculate the measurement signal obtained from the flex sensing unit to generate the moving distance and the moving direction of the object in the space.

8. The motion force feedback device according to claim 1, wherein the rotation mechanism comprises unilateral magnetic guidance.

9. A motion force feedback method, adapted to a device comprising an inertial measurement unit (IMU), an air velocity sensing (AVS) unit, a vector force feedback unit, and a processor, wherein the inertial measurement unit comprises at least one accelerometer and at least one gyroscope, wherein the vector force feedback unit comprises a motor and a rotation mechanism coupled to the motor, wherein the motion force feedback method comprises following steps of:

measuring a position and a direction of an object in a space by the inertial measurement unit, wherein the accelerometer is configured to measure linear acceleration, and the gyroscope is configured to measure angular velocity;

measuring a velocity change of the object relative to an ambient fluid and a relative moving velocity of the ambient fluid in at least one direction by the air velocity sensing unit;

dynamically adjusting a magnitude and a direction of a centrifugal force to provide force feedback by the vector force feedback unit; and calculating a measurement signal obtained from the inertial measurement unit and the air velocity sensing unit by the processor to generate a moving distance and a moving direction of the object in the space, and activating the vector force feedback unit to provide the force feedback by the processor according to a moving posture of the object and a contact force with the object.

10. The motion force feedback method according to claim 9, wherein calculating the measurement signal obtained from the inertial measurement unit and the air velocity sensing unit by the processor to generate the moving distance and the moving direction of the object in the space comprises following steps of:

measuring an ambient fluid throughput of the ambient fluid flowing through the object by the air velocity sensing unit;

generating the moving distance of the object in the space by the processor according to the ambient fluid throughput.

11. The motion force feedback method according to claim 9, wherein the device further comprises a turbine coupled to the air velocity sensing unit, wherein a number of the air velocity sensing unit is 1, wherein the motion force feedback method further comprises a following step of:

collecting the ambient fluid in the direction from different directions to the air velocity sensing unit by the turbine.

12. The motion force feedback method according to claim 9, wherein the air velocity sensing unit comprises a plurality of sub-air velocity sensing units, wherein the motion force feedback method further comprises a following step of:

respectively collecting the ambient fluid in the direction from different directions by the sub-air velocity sensing units.

13. The motion force feedback method according to claim 9, wherein calculating the measurement signal obtained from the inertial measurement unit and the air velocity sensing unit by the processor to generate the moving distance and the moving direction of the object in the space comprises a following step of:

generating the moving direction of the object in the space by the processor according to the linear acceleration and the angular velocity.

14. The motion force feedback method according to claim 9, wherein the inertial measurement unit is disposed on a joint of a puppet object.

15. The motion force feedback method of claim 9, wherein the device further comprises a flex sensing unit coupled to the processor, wherein the motion force feedback method further comprises a following step of:

calculating the measurement signal obtained from the flex sensing unit by the processor to generate the moving distance and the moving direction of the object in the space.

16. The motion force feedback method according to claim 9, wherein the motor comprises a flat motor.

17. The motion force feedback method according to claim 9, wherein the rotation mechanism comprises unilateral magnetic guidance.

18. A motion force feedback device comprising:
- an inertial measurement unit (IMU), configured to measure a position and a direction of an object in a space;
- an air velocity sensing (AVS) unit, configured to measure a velocity change of the object relative to an ambient fluid and a relative moving velocity of the ambient fluid in at least one direction;
- a vector force feedback unit, configured to dynamically adjust a magnitude and a direction of a centrifugal force to provide force feedback; and
- a processor, configured to calculate a measurement signal obtained from the inertial measurement unit and the air velocity sensing unit to generate a moving distance and a moving direction of the object, and activate the vector force feedback unit to provide the force feedback according to a moving posture of the object and a contact force with the object.

* * * * *